2,086,414

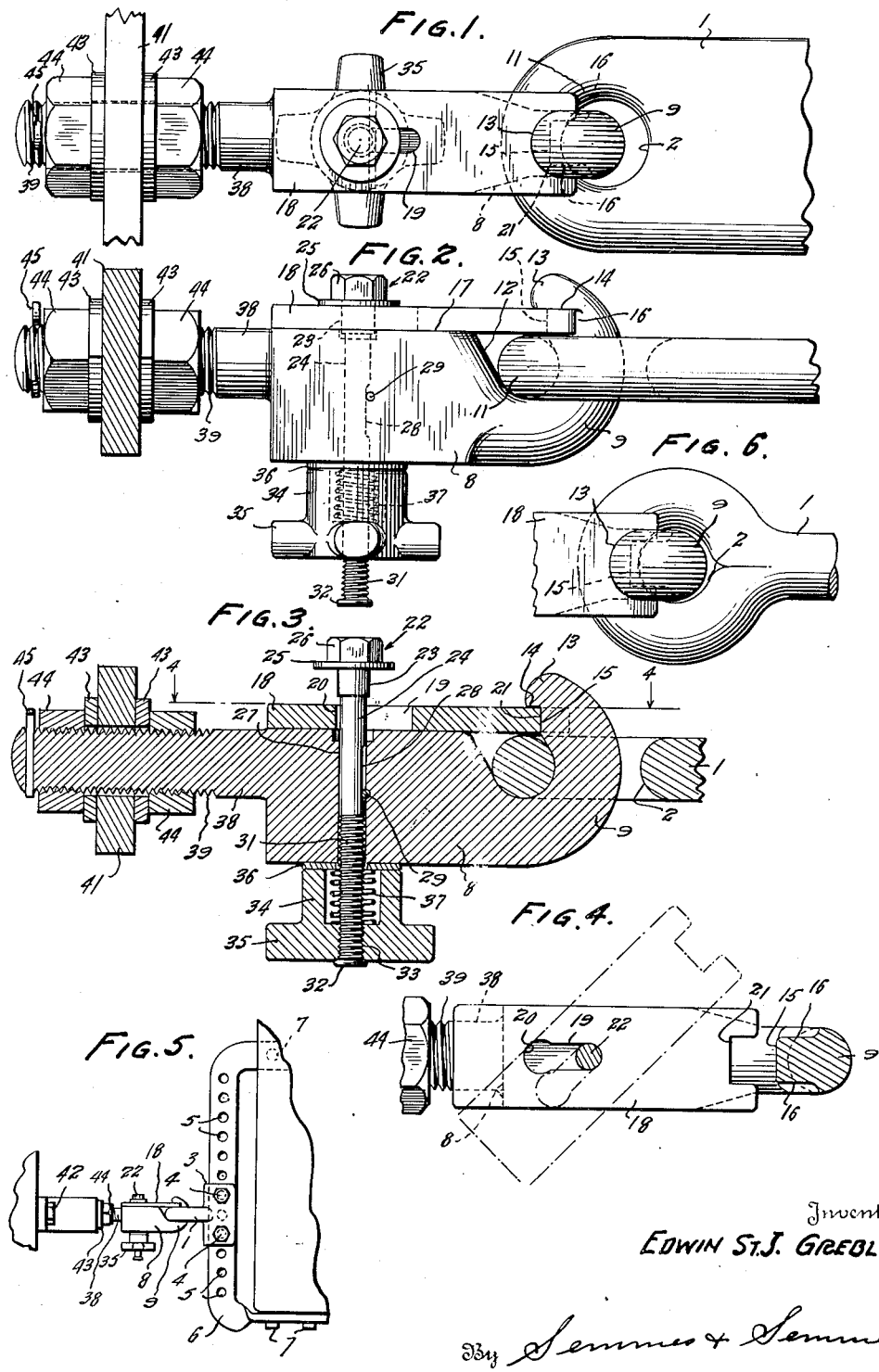
July 6, 1937. E. ST. J. GREBLE 2,086,414
COUPLING DEVICE
Original Filed March 10, 1934
Inventor
EDWIN ST.J. GREBLE
By Semmes & Semmes
Attorneys Patented July 6, 1937

UNITED STATES PATENT OFFICE 2,086,414

COUPLING DEVICE

Edwin St. J. Greble, Newark, N. J.

Application March 10, 1934, Serial No. 715,007
Renewed December 1, 1936

10 Claims. (Cl. 280—33.15)

My invention relates to coupling means and particularly such coupling as will permit of heavy tractive forces.

The invention is peculiarly adapted to the coupling of two vehicles, such as an automobile or motor vehicle and a trailer, a tractor and a gun carriage, etc. It is to be understood that the invention is not exclusively of use in these fields.

An object of my invention is to couple two vehicles together, such coupling being substantially without play but of great flexibility.

A further object of my invention is to devise a coupling which is easily and quickly locked in place or unlocked and which, when locked, will stay in this condition with small danger of accidental unlocking, and with all the parts fixed so that they cannot be lost or forgotten in the process of coupling or uncoupling.

Another object of the invention is to permit great freedom of movement between the vehicles which are coupled, without, however, permitting yawing or noisy play of parts.

Still another object of my invention is to provide a coupling and an attachment therefor which will permit the pull through the coupling to be along the line at a desirable and adjustable height from the roadway.

Yet another object of the invention is to provide a strong and durable coupling which is easy to repair or replace and which has few and simple parts which may be easily and cheaply manufactured.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect without limiting the improvements in their useful applications to the particular constructions, which, for the purpose of explanation, have been made the subject of illustration.

In the drawing:

Figure 1 is a top plan view of my device;

Figure 2 is a view in side elevation of the device;

Figure 3 is a cross sectional view taken along the line of pull between the male and female members;

Figure 4 is a view taken along line 4—4 of Figure 3, looking in the direction of the arrows, the unlocked position of the latch being shown in the dotted lines;

Figure 5 is a fragmental view in side elevation showing the draw bar for the device;

Figure 6 is a detail view of a modified female member for my coupling device.

Referring to the drawing, I have shown a female member 1 having a round aperture 2 therein. Female member 1 is provided with a flat base 3 having bolt holes therein through which may pass bolts 4. The bolts 4 are adapted to pass through bolt holes 5 in a draw bar 6. The draw bar 6 is bolted to one of the vehicles, for instance, the vehicle to be drawn (or trailer) by means of bolts 7. By withdrawing the bolts 4 and fitting them into other of the holes 5 the vertical distance of the coupling from the roadway can be adjusted to suit the type of pull, loads and other exigencies of operation, such as the height of the hook on the prime mover.

Adapted to fit through the hole 2 of the female member 1 is a male member 8 having a hook 9. The hook 9 fits through the aperture 2 and, as will be noted, there may be play between the front of the hook and the side of the aperture 2. There is no play, however, between the back of the hook and the side of the aperture 2, and the hook is so curved that a ring that will just fit around its curved part may still be coupled and uncoupled and thus give no play at all.

It will be noted that the female member 1 has a rounded section 11 which is adapted to fit between the back of the hook 9 and a guide wall 12. The hook 9 is provided with a rounded point 13. Below the rounded point 13 is a flattened surface 14 which is adapted to be substantially parallel to the roadway. Abutting the flattened surface 14 is a surface 15 which is substantially at right angles to the surface 14. The surface 15 abuts surfaces 16 which are substantially at right angles to the surface 15. This construction is readily apparent from an inspection of Figures 4 and 2.

Adapted to fit on top of the flat surface 17 of the male member 8 is a sliding latch member 18. The sliding latch member 18 is provided with a slot 19 which terminates in an unlatched annular aperture 20. The sliding latch 18 is adapted to slide along the top surface 17 of the male member. The latch 18 is provided with a slot 21 which is adapted to fit over the wall 14 and abut against the walls 15 and 16 of the hook 13 in the locked position. The locked position is shown in Figures 1, 2 and 3.

The position of the sliding latch 18 before it is slipped into place can be seen in Figure 4. The dotted line in Figure 4 shows the position of the sliding latch when it is desired to disengage the male member 8 and the female member 1.

Adapted to fit in the slot 19 is a holding bolt 22 provided with a section of unlatched diameter 23 and a section of reduced diameter 24. The holding bolt 22 has a washer 25 and a nut 26 which holds the washer firmly in place on the holding bolt. This washer-nut construction acts as a head to prevent passage of the holding bolt through the unlatched annular aperture 20 in the slot 19. The holding bolt passes down through an aperture 27 on male member 8. The bolt 22 is provided with a flattened surface 28 which is adapted to contact with a pin 29 that passes through the male member 8. This pin 29 slides against flattened surface 28 and prevents rotation of the holding bolt 22 and further locks it to the assembly. The holding bolt 22 is provided with screw threads 31 at its end opposite the washer 25. The extreme end of the holding bolt has a flattened surface 32 or a cotterpin attachment.

The screw threads 31 are adapted to engage with interior screw threads formed on a hand nut 33. This hand nut structure comprises an annular compartment 34 and finger holds 35. The top of the annular chamber 34 is adapted to bear against washer 36 which surrounds the holding bolt 22. Within the annular compartment 34 is a compression spring 37.

By revolving the hand nut 33 the structure may be screwed up and down on the holding bolt 22. In the position of the parts shown in Figure 3, the holding bolt occupies its uppermost position and can only be held in this position against tension of spring 37 by the operator pressing upwardly. In this position sliding latch 18 may be moved into the position shown in Figure 4 and revolved and the male and female parts of the coupling disengaged.

To couple the parts, the male and female members are caused to assume the position shown in the first three figures of the drawing. The sliding latch 18 is moved into forward position so that its slot 21 engages the surfaces 15, 16 and 14 on the male member. In this position the unlatched annular section 23 of the holding bolt 22 can pass down through aperture 20 thus holding sliding latch 18 firmly in place. Hand nut 33 is then wound up into the position shown in Fig. 2 and the holding bolt 22 is retained firmly in place. In this position, should the hand nut 33 become loosened, spring 37 will take up the slack and still hold holding bolt 22 in the down position. This is a factor of safety of great importance.

It will be noted that there is great flexibility of movement between the male and female members but that accidental uncoupling of these two members during use is largely minimized.

The male member 8 is provided with an extension 38 which has screw threads 39. This extension 38 passes through an aperture in a bracket 41 which may be held by means of bolts 42 to the vehicle which furnishes the motive power. Suitable washers 43 and nuts 44 hold the extension 38 of the male member 8 firmly in place on the bracket 41. A cotter pin 45 prevents the nut taking the major portion of the tension strains from coming off during use.

In Figure 6 is shown a female member 1 which may be forged out of a bar of material. The clearance between the male and female members may be less than is shown in Figure 1. In Figure 6 the clearance between these members is shown as of considerably smaller magnitude than in the Figure 1 form.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a device of the character described, a female member, a hook adapted to fit therein, and a sliding latch having an end with a slot therein adapted to fit over the hook and under the end thereof, and a holding member adapted to hold the latch in place and permit pivoting of the latch when disengaged from the hook.

2. In a device of the character described a female member, a hook adapted to fit therein, a sliding latch having an aperture and having an end with a slot therein adapted to fit over the hook, and a holding bolt adapted to fit in the aperture in the latch to hold the latch in place.

3. In a device of the character described, a female member, a hook adapted to fit therein, a sliding latch having an end with a slot therein adapted to fit over the hook, a holding member adapted to hold the latch in place and permit pivoting of the latch when disengaged from the hook and spring means to prevent such loosening of the holding member as to permit accidental displacement of the latch.

4. In a device of the character described, a female member, a hook adapted to fit therein, a sliding latch having an end with a slot therein adapted to fit over the hook and under the end thereof, a holding bolt adapted to fit in an aperture in the latch to hold the latch in place and spring means to prevent such loosening of the holding bolt as to permit accidental displacement of the latch.

5. In a device of the character described, a female member, a hook adapted to fit therein, a sliding latch adapted to fit over the female member and hold the hook so that there is flexibility but small play between the parts, said latch having a slot therein for engaging the hook and a second slot therein, a holding bolt adapted to pass through the second slot in the latch, means to tighten the bolt in place, and spring means to tension the bolt in place upon accidental loosening of the tightening means.

6. In a device of the character described, a female member, a hook adapted to fit therein, a sliding latch adapted to fit over the female member and hold the hook, said latch having a slot therein of two widths, a holding bolt passing through the slot in the latch having two thicknesses to conform to the two widths of slot in the latch, and means to tighten the bolt in place.

7. In a device of the character described, a female member, a hook adapted to fit therein, a sliding latch adapted to fit over the female member and hold the hook, said latch having a slot therein of two widths, a holding bolt passing through the slot in the latch having two thicknesses to conform to the two widths of slot in the latch, means to tighten the bolt in place, and spring means to tension the bolt in place upon accidental loosening of the tightening means by maintaining the greater thickness of the bolt in the greater width of the slot.

8. In a device of the character described, a female member, a hook adapted to fit therein having a bent-over end and a flat surface on the under side of the bent-over end, a sliding revolvable latch adapted to fit over the female member and between the female member and the flat under surface of the bent-over end and hold the hook so that there is flexibility but small play between the parts, said latch having a slot in its end for engaging the hook, and means to prevent displacement of the latch once it has been placed in hook-engaging position.

9. In a device of the character described, a female member, a hook adapted to fit therein having a bent-over end and a flat surface on the under side of the bent-over end, a sliding latch adapted to fit over the female member and between the female member and the flat under surface of the bent-over end and hold the hook so that there is flexibility but small play between the parts, said latch having a slot in its end for engaging the hook, a holding bolt for holding the latch means to tighten the bolt in place, and spring means to tension the bolt in place upon accidental loosening of the tightening means.

10. In a device of the character described, a female member, a hook adapted to fit therein, a sliding latch adapted to fit over the female member and hold the hook, said latch having a slot in its end for engaging the hook and a second slot therein, a holding bolt adapted to pass through the second slot, said holding bolt having two thicknesses, one of which is adapted to fit in a thickened portion of said second slot and the other of which is adapted to fit in a narrowed portion of said second slot, said holding bolt having a screw threaded portion, a tightening member adapted to be screwed on said portion, and a spring carried by the tightening member whereby upon accidental loosening of the tightening member the bolt will be tensioned in place.

EDWIN ST. J. GREBLE.